Aug. 18, 1931. M. E. KRAXBERGER Re. 18,159

CORN HARVESTING APPARATUS

Original Filed April 15, 1926 2 Sheets-Sheet 1

Inventor
M. E. Kraxberger
By Watson E. Coleman
Attorney

Aug. 18, 1931.

M. E. KRAXBERGER

CORN HARVESTING APPARATUS

Re. 18,159

Original Filed April 15, 1926 2 Sheets-Sheet 2

Inventor

M. E. Kraxberger

By Watson E. Coleman

Attorney

Reissued Aug. 18, 1931

Re. 18,159

UNITED STATES PATENT OFFICE

MICHAEL E. KRAXBERGER, OF BUCKINGHAM, COLORADO

CORN HARVESTING APPARATUS

Original No. 1,693,085, dated November 27, 1928, Serial No. 102,250, filed April 15, 1926. Application for reissue filed January 8, 1931. Serial No. 507,538.

This invention relates to a corn harvesting apparatus and more particularly to a device of this character adapted to harvest ears of corn while leaving stalks standing in the field.

An important object of the invention is to produce a device of this character having a novel and improved manually controlled knife for cutting the ears of corn from the stalks.

A further object of the invention is to provide a novel means for positioning the corn stalks so that the ears of corn carried thereby will be conveniently arranged with respect to the person controlling the knife.

A still further object of the invention is the provision in a device of this character of means for conveying the severed ears of corn to a secondary mechanism which may be either a corn harvester or simply a barge for the reception of the ears.

These and other objects I attain by the construction shown in the accompanying drawings, wherein for the purpose of illustration is shown a preferred embodiment of my invention and wherein:—

Figure 1:
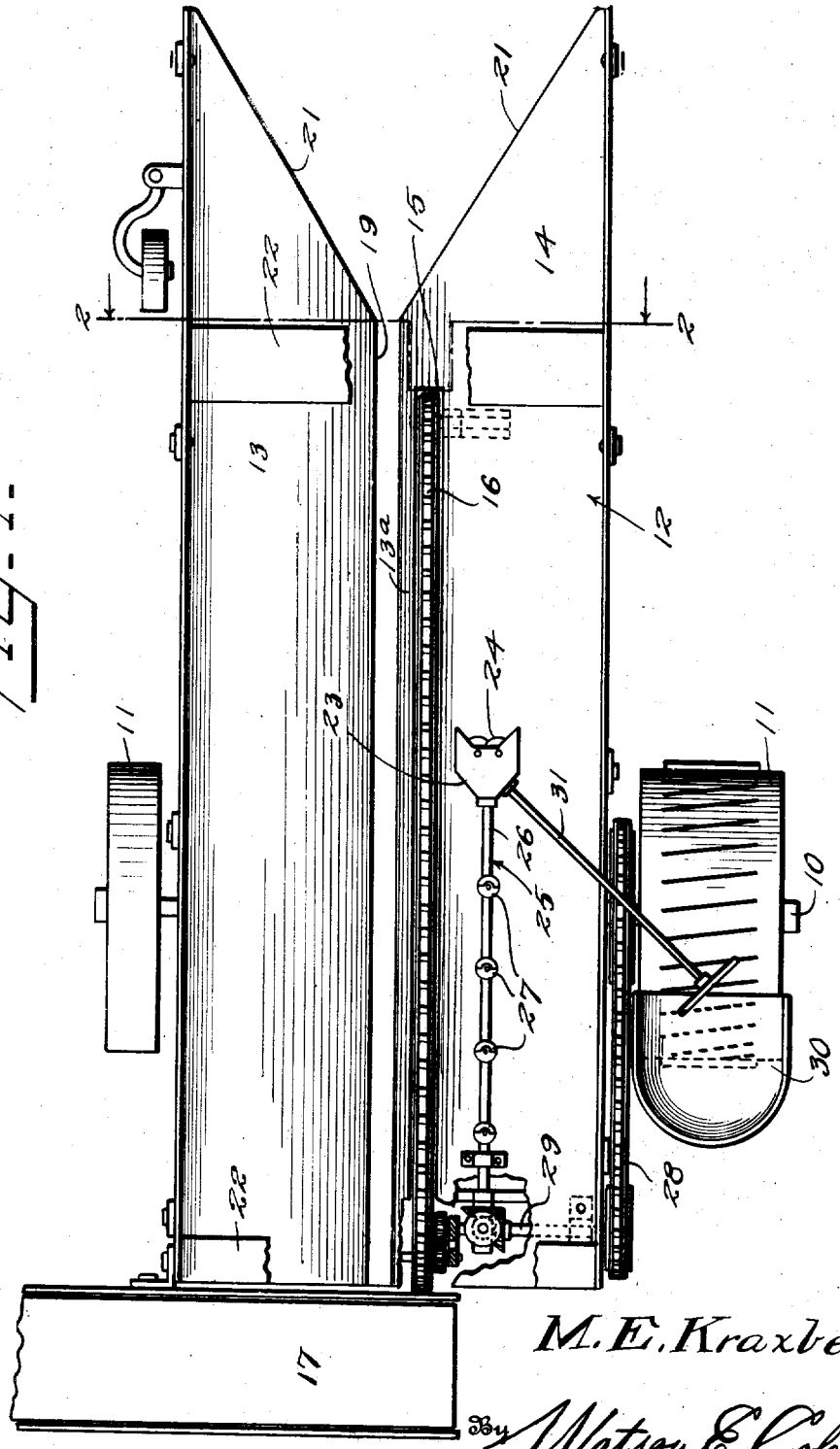
Figure 1 is a plane view of a corn harvesting machine constructed in accordance with my invention.
Figure 2:
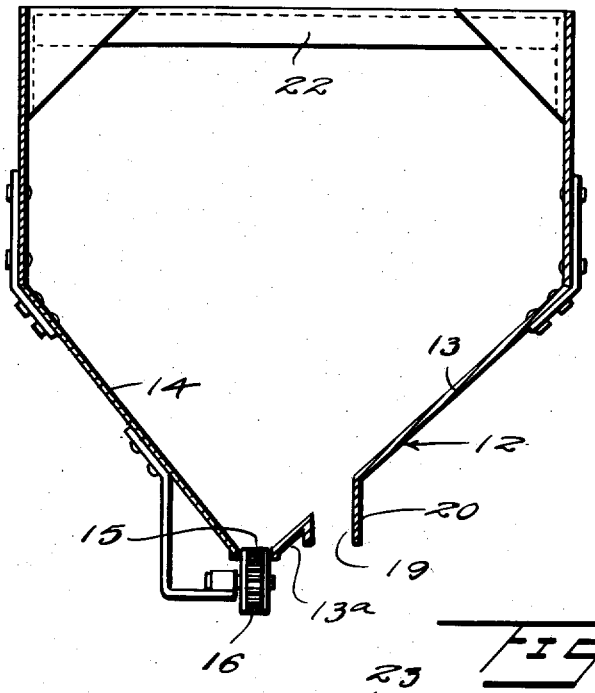
Figure 2 is a section on the line 2—2 of Figure 1.
Figure 3:
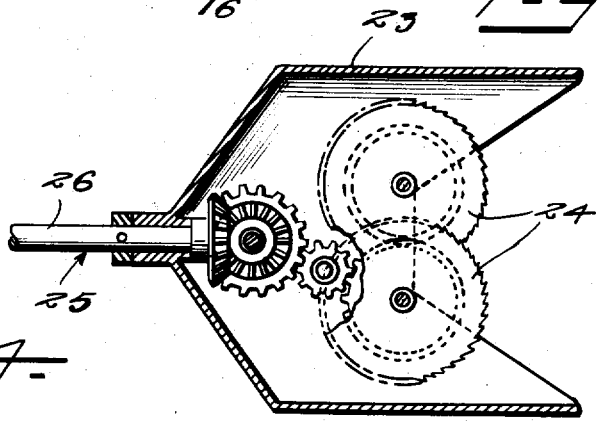
Figure 3 is a detail sectional view showing one manner of driving the knives.
Figure 4:
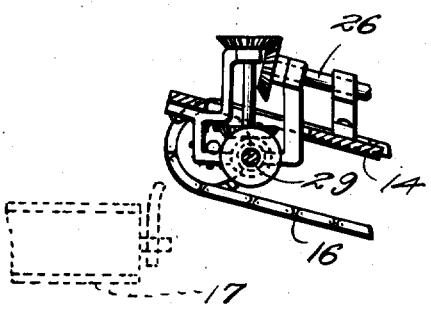
Figure 4 is a further detail view showing the drive connections for the conveyor and knife.

Referring now more particularly to the drawings, the numeral 10 generally indicates the axle of a wheel supported structure having supporting wheels 11. From this axle is supported a longitudinally extending trough 12 including side members 13 and 14 converging downwardly to an open bottom 15 beneath which operates a conveyor 16 of any suitable character. The rear end of this conveyor may discharge into a transversely extending conveyor, generally indicated at 17 and this conveyor may discharge to either a husking mechanism or a barge, as desired. Neither of these mechanisms are disclosed.

The open bottom of the trough beneath which the conveyor operates terminates a little short of the end of the trough, as indicated, providing at the ends of the trough sections 18 securing to the trough side 14 a lower end portion 13[a] of the trough side 13 which is separated from the body of this trough side by a longitudinally extending slot 19. The sections of the trough at the slot are suitably flanged, as at 20, to prevent the formation of cutting edges. At the forward end of the trough, diverging guides 21 are provided for directing stalks to the slot 19 and the slot is made of such width that while comfortably accommodating stalks of corn, it will not permit passage of ears which have been removed therefrom. The sides 13 and 14 of the trough are connected at their upper ends by suitable arch braces 22.

A cutting knife is provided including a head 23 bearing cutters 24 operated from a flexible shaft 25. This flexible shaft is, at present shown, composed of short rigid lengths of shafting 26 connected by universal joints 27, but any construction for providing a vertical drive may be employed. The flexible shaft 25 and the conveyor 16 are driven in any suitable manner. In the present instance, one of the wheels 11 is disclosed as a drive wheel having chain and sprocket connection 28 with a shaft 29 from which the drives of the conveyor and shaft 25 are taken.

Adjacent the side 14 of the trough is arranged an operator's seat 30 and the head 23 is provided with a handle 31 by means of which the head may be manipulated from the seat to bring the knives 24 into engagement with the ears of corn as the stalks pass through the slot 20. The severed ears of corn fall to the bottom of the trough and are directed thereby to slot 15 and accordingly to the conveyor 16.

It will, of course, be obvious that the construction hereinbefore set forth is capable of a certain range of change and modification without materially departing from the spirit of the invention and I accordingly do not limit myself to such specific structure except as hereinafter claimed.

I claim:—

In corn harvesting mechanism and in combination, a trough, there being a longitudinally extending slot in said trough, means at one end of the trough for directing plant stems into the slot as the trough is moved along a row, flexibly mounted power driven knives adapted to be moved in any direction independently of said trough for severing ears of corn from the corn stalks during their passage through the slot, a conveyor in the bottom of the trough, said slot being of a width to permit passage of the corn stalks while preventing passage of the ears of corn whereby the severed ears of corn are separated from the stalks and are placed on the conveyor.

In testimony whereof I hereunto affix my signature.

MICHAEL E. KRAXBERGER.